US008845490B2

United States Patent
Chan et al.

(10) Patent No.: US 8,845,490 B2
(45) Date of Patent: *Sep. 30, 2014

(54) METHOD AND SYSTEM FOR DELAYING SHIFT AND THROTTLE COMMANDS BASED ON ENGINE SPEED IN A MARINE VESSEL

(75) Inventors: Anson Chin Pang Chan, Richmond (CA); Pierre Garon, Trois-Rivières (CA); Thomas Samuel Martin, Vancouver (CA)

(73) Assignee: Marine Canada Acquisition Inc., Richmond (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/476,941

(22) Filed: May 21, 2012

(65) Prior Publication Data

US 2013/0030663 A1 Jan. 31, 2013

Related U.S. Application Data

(63) Continuation-in-part of application No. 12/703,297, filed on Feb. 10, 2010, now Pat. No. 8,182,396.

(51) Int. Cl.
*B60W 10/04* (2006.01)
*B60W 30/19* (2012.01)
*B60W 10/11* (2012.01)
*B60W 10/06* (2006.01)
*B60W 30/18* (2012.01)

(52) U.S. Cl.
CPC .............. *B60W 10/06* (2013.01); *B60W 30/19* (2013.01); *B60Y 2200/24* (2013.01); *B60W 10/11* (2013.01); *B60Y 2200/42* (2013.01); *B60W 30/18181* (2013.01); *B60W 2510/0638* (2013.01)
USPC .......................................................... 477/110

(58) Field of Classification Search
USPC .................................................. 477/110, 111
See application file for complete search history.

(56) References Cited

U.S. PATENT DOCUMENTS

| | | | |
|---|---|---|---|
| 4,071,818 | A | 1/1978 | Krisst |
| 4,350,041 | A | 9/1982 | Loker et al. |
| 4,898,132 | A | 2/1990 | Kanno |
| 4,950,988 | A | 8/1990 | Garshelis |
| 5,085,302 | A | 2/1992 | Kriesels |
| 5,228,548 | A | 7/1993 | Bohlin |
| 6,470,852 | B1 | 10/2002 | Kanno |
| 6,587,765 | B1 | 7/2003 | Graham et al. |
| 6,595,179 | B1 | 7/2003 | Kanno |
| 6,679,740 | B1 | 1/2004 | Imanaka et al. |
| 6,823,745 | B2 | 11/2004 | Goto et al. |
| 6,871,555 | B2 | 3/2005 | May |

(Continued)

OTHER PUBLICATIONS

AS5045 12 Bit Programmable Magnetic Rotary Encoder, www.austriamicrosystems.com, 2008.

(Continued)

*Primary Examiner* — Dirk Wright
(74) *Attorney, Agent, or Firm* — Cameron IP

(57) ABSTRACT

A method for delaying shift and throttle commands based on engine speed comprises establishing a predetermined threshold engine speed. Shift and throttle commands are calculated based on the position of a joystick which allows an operator to manually control shift and throttle functions. Execution of the shift and throttle commands is delayed if the engine speed is above the predetermined maximum threshold engine speed.

20 Claims, 21 Drawing Sheets

(56) References Cited

U.S. PATENT DOCUMENTS

| | | |
|---|---|---|
| 7,131,339 B2 | 11/2006 | Kwun et al. |
| 7,133,758 B2 | 11/2006 | Otto et al. |
| 7,142,955 B1 | 11/2006 | Kern et al. |
| 7,179,143 B2 | 2/2007 | Mizuguchi et al. |
| 7,330,782 B2 | 2/2008 | Graham et al. |
| 7,335,070 B2 | 2/2008 | Yoda et al. |
| 7,348,321 B2 | 3/2008 | Legard Ibanez |
| 7,377,827 B1 | 5/2008 | Sturdy et al. |
| 7,469,604 B2 | 12/2008 | Hedayat et al. |
| 8,182,396 B2 * | 5/2012 | Martin et al. ............... 477/110 |
| 8,347,859 B2 * | 1/2013 | Garon et al. ............... 123/399 |
| 2004/0090195 A1 | 5/2004 | Motsenbocker |
| 2004/0121661 A1 | 6/2004 | Okuyama |
| 2004/0142611 A1 | 7/2004 | Itoi |
| 2006/0166573 A1 | 7/2006 | Vetta et al. |
| 2007/0227268 A1 | 10/2007 | Ouyang et al. |
| 2008/0216589 A1 | 9/2008 | Shimizu |
| 2009/0011665 A1 * | 1/2009 | Sakaguchi et al. ............... 440/1 |
| 2010/0275879 A1 * | 11/2010 | Garon et al. ............... 123/399 |
| 2010/0280684 A1 * | 11/2010 | Garon ............... 701/21 |
| 2010/0280685 A1 * | 11/2010 | Garon et al. ............... 701/21 |

OTHER PUBLICATIONS

AS5000 Series Magnetic Sensor Circuits, Magnet Selection Guide, www.austriamicrosystems.com, 2008.
BRP Evinrude Icon Interactive Control System Press Release, Feb. 12, 2009, Bombardier Recreational Products Inc., Miami, Florida.

* cited by examiner

| Lever position | Gear command | Throttle command | Gear lamps |
|---|---|---|---|
| FORWARD WOT | Forward | 100% | △ —32 ○ ▽ |
| FORWARD | Forward | 0 - 100% | |
| FORWARD DETENT | Forward | 0% | |
| NEUTRAL DETENT | Neutral | 0% | △ ● —34 ▽ |
| REVERSE DETENT | Reverse | 0% | △ ○ ▼ —36 |
| REVERSE | Reverse | 0 - 60% | |
| REVERSE WOT | Reverse | 60% | |

FIG. 6

METHOD AND SYSTEM FOR DELAYING SHIFT AND THROTTLE COMMANDS BASED ON ENGINE SPEED IN A MARINE VESSEL

CROSS-REFERENCE TO RELATED APPLICATION

This application is a continuation-in-part of application Ser. No. 12/703,297 filed in the United States Patent Office on Feb. 10, 2010, now U.S. Pat. No 8,182,396 the full disclosure of which is incorporated herein by reference and priority to which is claimed.

BACKGROUND OF THE INVENTION

1. Field of the Invention

The present invention relates to electronic shift and throttle systems and, in particular, to delaying shift and throttle functions based on engine speed.

2. Description of the Related Art

Vehicles such as marine vessels are often provided with electronic shift and throttle systems. These systems typically allow an operator to control the shift and throttle functions of a propulsion unit using a control lever which is pivotally mounted on a control head. The control lever is moveable between a forward wide open throttle (forward WOT) position and a reverse wide open throttle (reverse WOT) position, through a neutral position. A controller reads the position of the control lever as the control lever moves through its operational range. The controller sends shift commands and throttle commands which drive a shift actuator and a throttle actuator based on the position of the control lever.

For example, U.S. Pat. No. 7,330,782 issued on Feb. 12, 2008 to Graham et al. and the full disclosure of which is incorporated herein by reference, discloses an electronic shift and throttle system in which a position sensor is used to sense the position of a control lever. The position sensor is electrically connected to an electronic control unit (ECU) and sends an electrical signal to the ECU. The ECU is able to determine the position of the control lever based on the voltage level of the electrical signal received from the position sensor. The ECU then determines the positions to which the output shafts of the shift actuator and the throttle actuator should be set.

Each of the output shafts is also coupled to a corresponding position sensor. Electrical signals sent by these position sensors may be used to determine the positions of the output shafts. This feedback may be used to govern the ECU. This is beneficial because variances and play between components used to link throttle actuators to throttles make it desirable to calibrate throttle controls. Calibrated throttle controls allow an operator to delay shift and throttle functions based on engine speed in a marine vessel.

SUMMARY OF THE INVENTION

It is an object of the present invention to provide an improved method and system for delaying shift and throttle commands based on engine speed in a marine vessel.

There is accordingly provided a method for delaying shift and throttle commands based on engine speed. The method comprises establishing a predetermined threshold engine speed. Shift and throttle commands are calculated based on the position of a joystick which allows an operator to manually control shift and throttle functions. Execution of the shift and throttle commands is delayed if the engine speed is above the predetermined maximum threshold engine speed.

In one embodiment, a first threshold engine speed and a second engine threshold speed are established. The first threshold engine speed is greater than the second engine threshold speed. For example, the first threshold engine speed may be 1,500 RPM while the second threshold engine speed may be 800 RPM. The throttle actuator is moved to an idle position to decrease the engine speed until the engine speed falls below the first threshold engine speed. The shift actuator is moved to a neutral position after the engine speed falls below the first predetermined threshold engine speed. Execution of the throttle command is delayed until after the shift actuator is moved to the neutral position. Execution of the shift command is delayed until after the execution of the throttle command and the engine speed rises above the second predetermined threshold engine speed.

Also provided is an electronic shift and throttle system for delaying shift and throttle commands based on the speed of an engine. The system comprises a sensor for sensing the speed of the engine. There is a shift actuator for shifting between a forward gear and a reverse gear, through a neutral gear. There is also a throttle actuator for moving a throttle between an idle position and a wide open throttle position. A control head includes a joystick for manually controlling shift and throttle functions of the engines. The joystick is moveable through a range of positions. An engine control unit calculates a shift command and throttle command based on a position of the joystick. An engine servo module delays execution of the shift command if the speed of the engine is above a first predetermined threshold engine speed. In particular, the engine servo module commands the throttle actuator to move the throttle to the idle position to decrease engine speed and delays execution of the shift command until after the engine speed falls below the first threshold engine speed.

In one embodiment, the engine servo module commands the throttle actuator to move the throttle actuator towards the wide open position throttle position, to increase the engine speed, after the engine speed falls below the first predetermined threshold speed. The engine servo module also commands the shift actuator to shift to the neutral gear after engine speed falls below the first predetermined threshold engine speed. The engine servo module the delays the execution of the throttle command until after the shift actuator shifts to neutral the neutral gear. The engine servo module delays execution of the shift command until the engine speed rises above a second predetermined threshold engine speed.

The present invention provides an improved method for delaying shift and throttle commands based on engine speed that allows an operator to quickly shift from forward high throttle to reverse high throttle or vice versa without over-stressing the gear box and while helping to prevent the engine from stalling under the high opposite force of the propeller.

BRIEF DESCRIPTIONS OF DRAWINGS

The invention will be more readily understood from the following description of the embodiments thereof given, by way of example only, with reference to the accompanying drawings, in which:

FIG. 6 is a table illustrating the lighting of indicator or gear lamps as the control lever of FIG. 5 is moved through the operational range;

DESCRIPTION OF THE PREFERRED EMBODIMENTS

Figure 1:
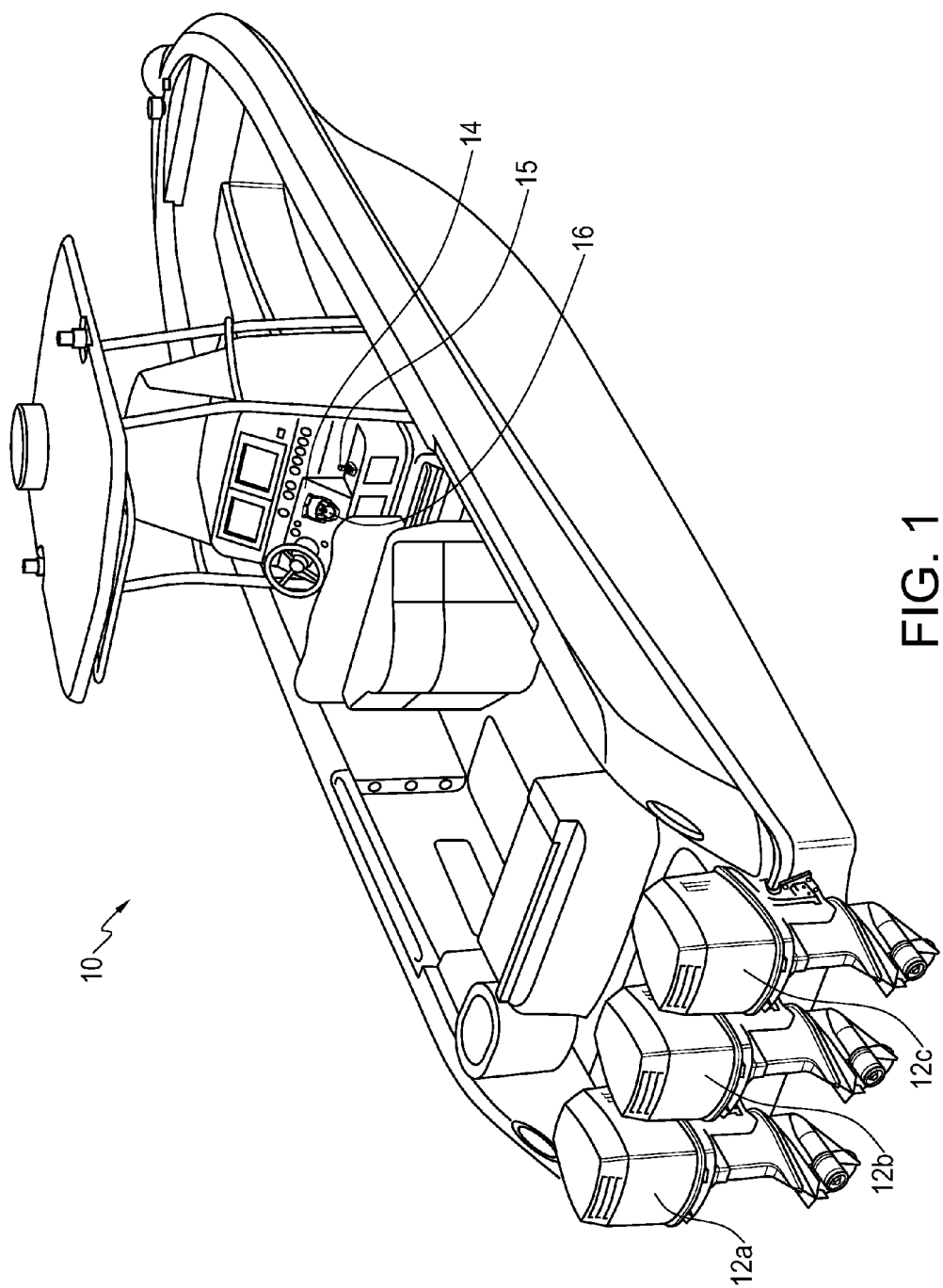
FIG. 1 is a perspective view of a marine vessel provided with a plurality of propulsion units and an improved electronic shift and throttle system.

Referring to the drawings and first to FIG. 1, this shows a marine vessel 10 which is provided with a plurality of propulsion units in the form of three outboard engines 12a, 12b and 12c. However, in other examples, the marine vessel 10 may be provided with any suitable number of inboard and/or outboard engines. It is common to see two engines and practically up to five engines in pleasure marine vessels. The marine vessel 10 is also provided with a control head station 14 that supports a joystick 15 and a control head 16. The joystick 15 and the control head 16 are each provided with a microprocessor (not shown).

Figure 2:
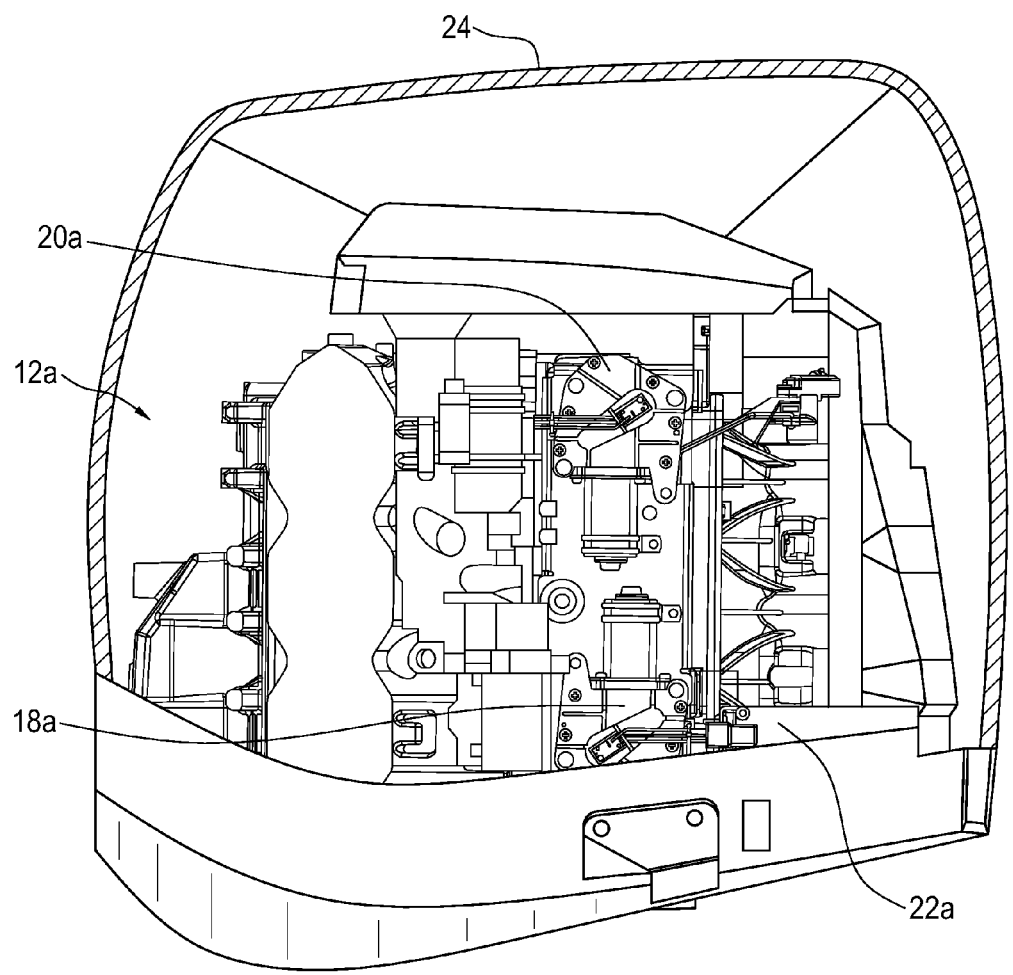
FIG. 2 is a side view of an engine of one of the propulsion units of FIG. 1.

A first one of the engines, namely the port engine 12a, is best shown in FIG. 2. The port side engine 12a includes a shift actuator 18a, a throttle actuator 20a, and an electronic servo module (ESM) 22a; all of which are disposed within a cowling 24. Second and third ones of the engines, namely the center engine 12b and starboard 12c engine, have substantially the same structure as the port engine 12a and are accordingly not described in detail herein.

Figure 3:
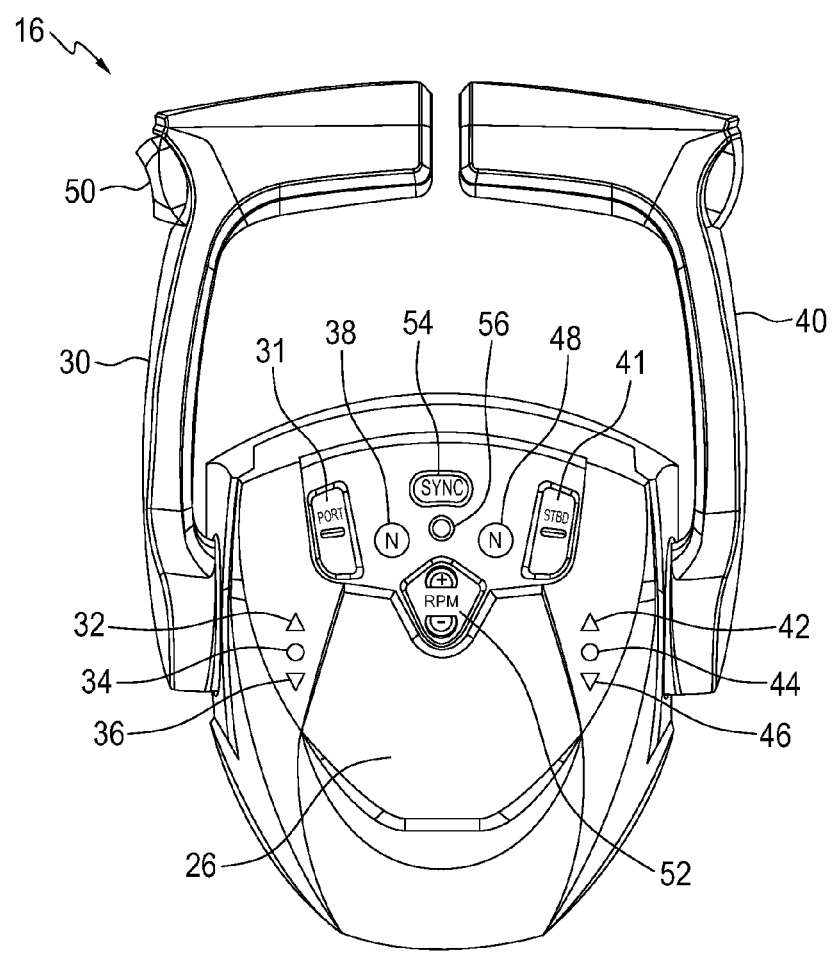
FIG. 3 is a top view of the a control head of the marine vessel of FIG. 1.
Figure 20:
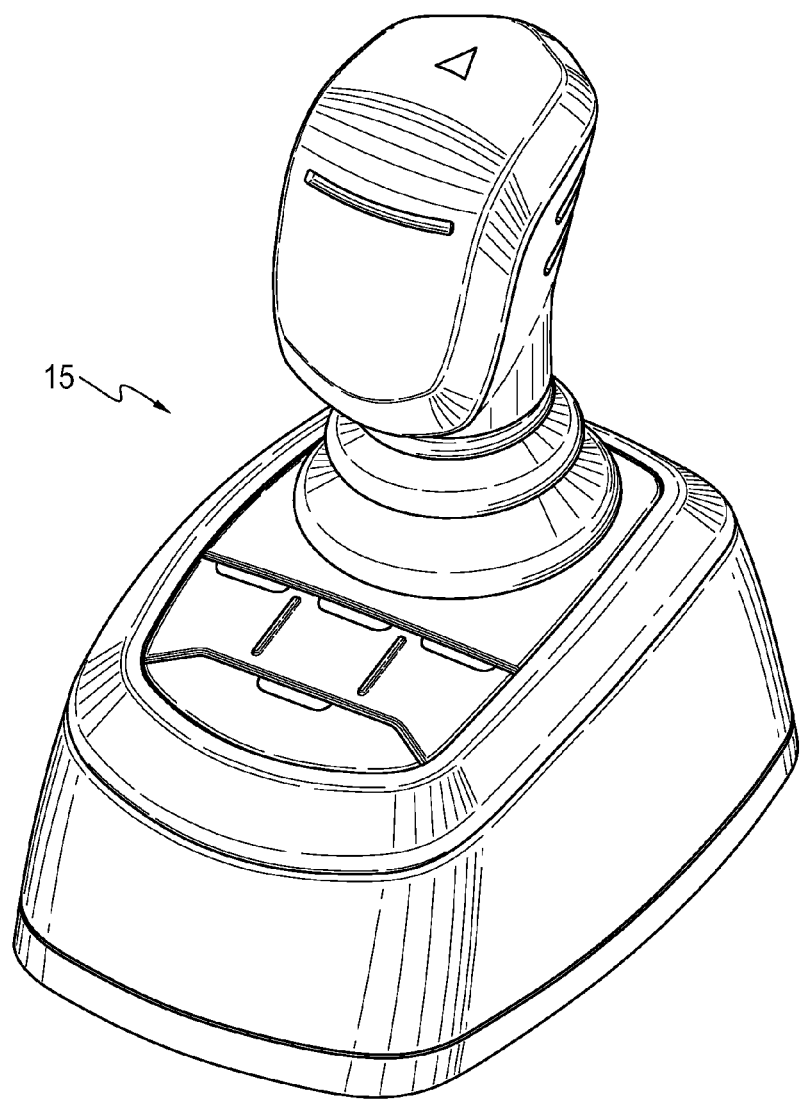
FIG. 20 is perspective view of a joystick of the marine vessel of FIG. 1.

The control head 16 is best shown in FIG. 3. The control head 16 includes a housing 26. A port control lever 30 and starboard control lever 40 are each pivotally mounted on the housing 26. The port control lever 30 normally controls the shift and throttle functions of the port engine 12a but, in this example, also controls the shift and throttle functions of the center engine 12b both of which are shown in FIG. 1. The starboard control lever 40 controls the shift and throttle functions of the starboard engine 12c which is also shown in FIG. 1. In a marine vessel with five engines, the port control lever would control the shift and throttle functions of the port, center port and center engines while the starboard control lever would control the shift and throttle functions of the starboard engine and starboard center engine. Alternatively, the joystick 15 which is best shown in FIG. 20 may be used to control the shift and throttle functions of the engines.

Referring back to FIG. 3, the port control lever 30 is provided with a master trim switch 50 which allows an operator to simultaneously trim all of the engines. The port and starboard engines are trimmed individually using a respective port trim button 31 and starboard trim button 41, which are both disposed on the housing 26. The center engine 12b is under the control of a center trim button 31 (not shown).

The housing 26 also supports a plurality of indicator or gear lamps which, in this example, are LED lamps. A port forward indicator 32, port neutral indicator 34, and port reverse indicator 36 are disposed on a side of housing 26 adjacent the port control lever 30. A starboard forward indicator 42, starboard neutral indicator 44, and a starboard reverse indicator 46 are disposed on a side of housing 26 adjacent the starboard control lever 40. A port neutral input means 38 and starboard neutral input means 48 are also disposed on the housing 26. An RPM input means 52, synchronization (SYNC) input means 54, and SYNC indicator lamp 56 are also all disposed on the housing 26. In this example, the port neutral input means 38, starboard neutral input means 48, RPM input means 52, and SYNC input means 54 are buttons but any suitable input devices may be used.

Figure 4:
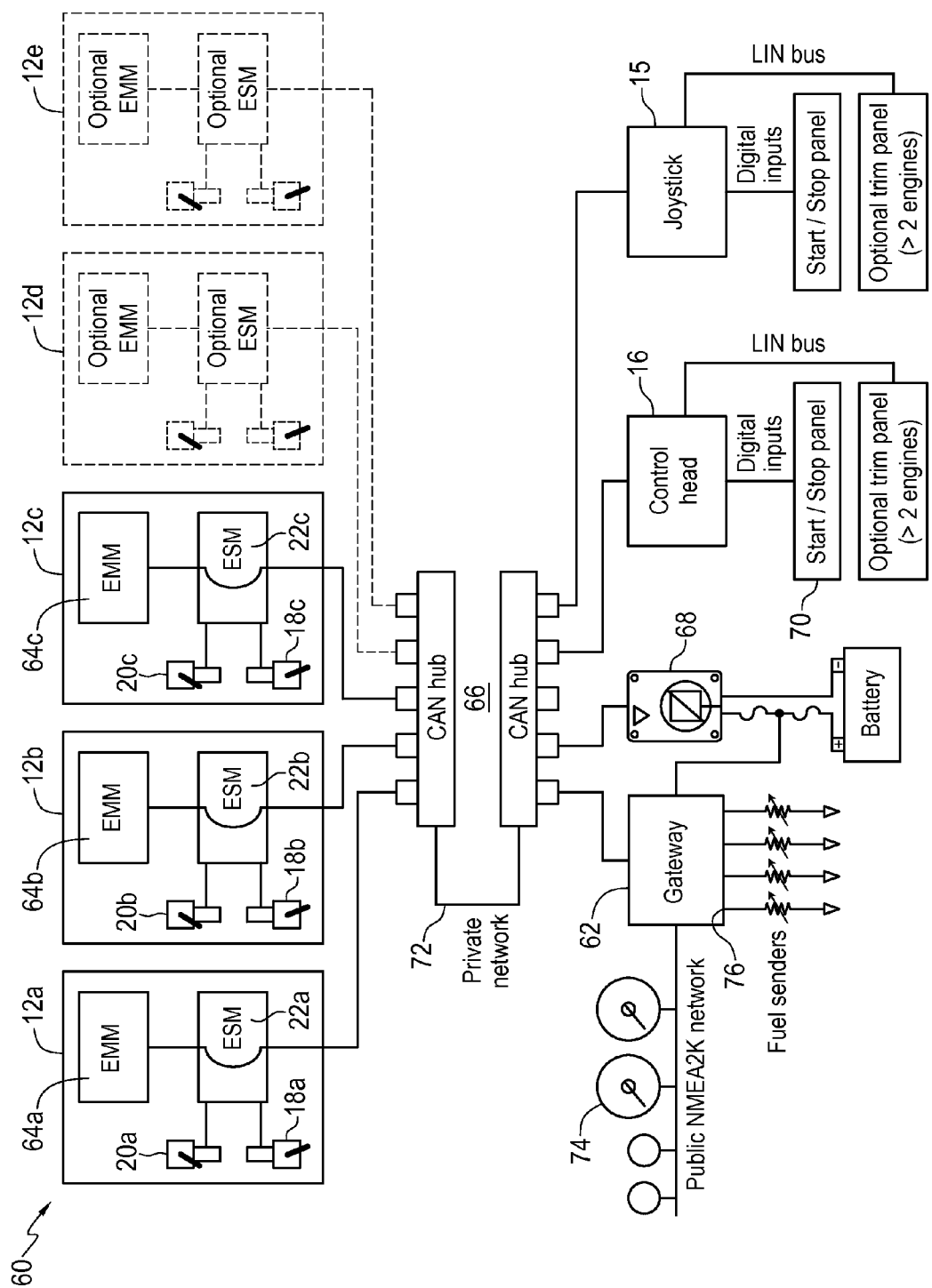
FIG. 4 is a schematic diagram illustrating the electronic shift and throttle system of FIG. 1.

As best shown in FIG. 4, the joystick 15 and the control head 16 together with the engines 12a, 12b and 12c, and their corresponding shift actuators 18a, 18b and 18c; throttle actuators 20a, 20b and 20c; and ESMs 22a, 22b and 22c, form part of an electronic shift and throttle system 60. The electronic shift and throttle system 60 further includes a gateway 62 and a plurality of engine management modules (EMMs) 64a, 64b and 64c. Each EMM is associated with a corresponding ESM. The control head, gateway, ESMs, and EMMs communicate with each other over a private CAN network 66. The electronic shift and throttle system 60 is designed to support both the joystick 15 and the control head 16 as well as up to five engines. Components of optional fourth and fifth engines 12d and 12e are shown in ghost.

A single master ignition switch 68 provides power to the entire private CAN network 66. However, start and stop functions are achieved by individual switches 70 read by the joystick 15 or the control head 16 as discrete inputs or serial data. Any command an operator inputs to the joystick 15 or the control head 16 to start, stop, trim, shift or accelerate one of the engines 12a, 12b or 12c is sent to the corresponding ESM 22a, 22b or 22c and corresponding EMM 64a, 64b or 64c over the CAN network 66. The ESMs and EMMs are each provided with a microprocessor (not shown). In this example, a private network cable 72 that carries the CAN lines from the joystick 15 and the control head 16 to the engines 12a, 12b and 12c has two separate wires used to shut down the engines in the event that the CAN network 66 fails.

Information from the electronic shift and throttle system 60 is made available to devices on a NMEA2K public network 74 through the gateway 62. The gateway 62 isolates the electronic shift and throttle system 60 from public messages, but transfers engine data to displays and gauges (not shown) on the public network 74. The gateway 62 is also provided with a plurality of analog inputs 76 which may be used to read and broadcast fuel senders or oil senders or other resistive type senders such as rudder senders or trim tab senders on the public network 74.

Figure 5:
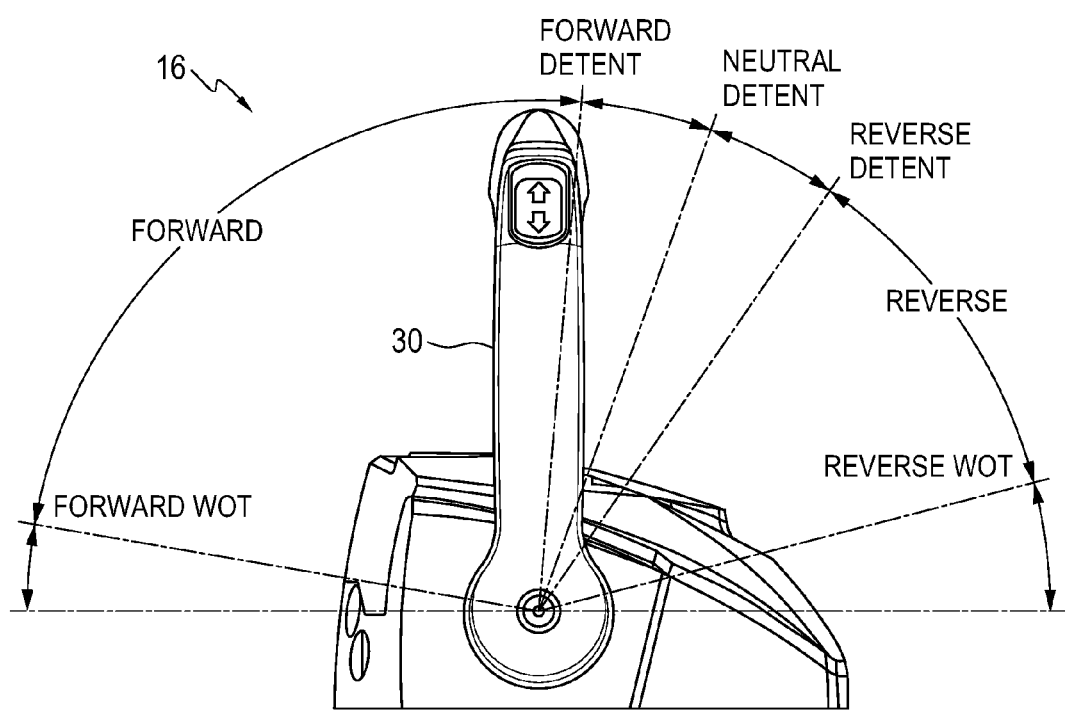
FIG. 5 is an elevation view of the control head of FIG. 3 illustrating an operational range of a control lever thereof.

Referring now to FIG. 5, the port side 30 control lever is moveable between a forward wide open throttle (forward WOT) position and a reverse wide open throttle (reverse WOT) position, through a neutral position. An operator is able to control the shift and throttle functions of the port engine 12*a* by moving the port control lever 30 through its operational range. The port control lever 30 is also provided with a forward detent, neutral detent, and reverse detent all disposed between the forward WOT position and reverse WOT position. This allows the operator to physically detect when the port control lever 30 has moved into a new shift/throttle position. As shown in FIG. 6, the port forward indicator 32, port neutral indicator 34, and port reverse indicator 36 light up to reflect the position of the port control lever 30 shown in FIG. 5.

Figure 7:
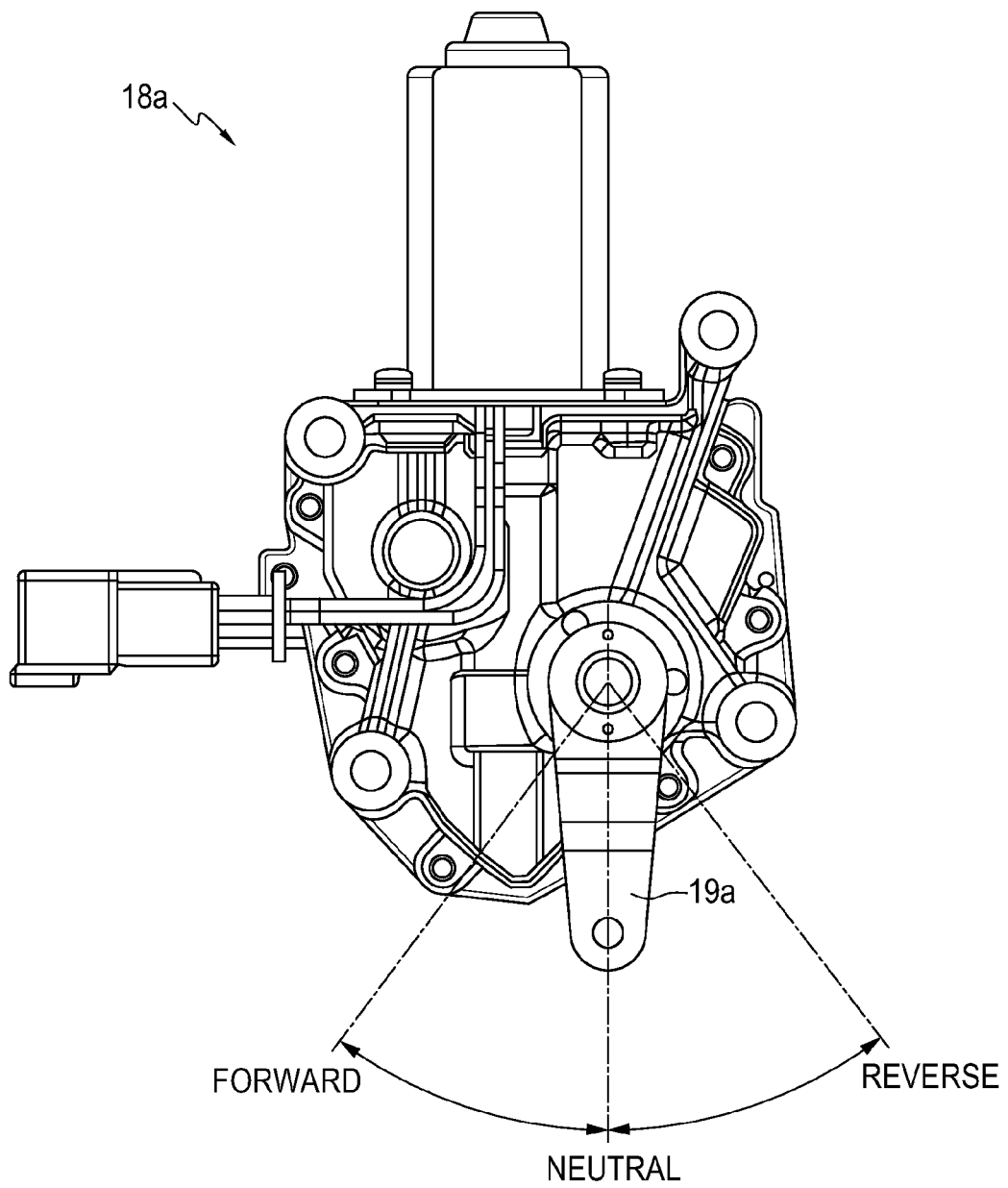
FIG. 7 is side elevation view of a shift actuator of the propulsion unit of FIG. 2 illustrating an operational range of an actuator arm thereof.
Figure 8:
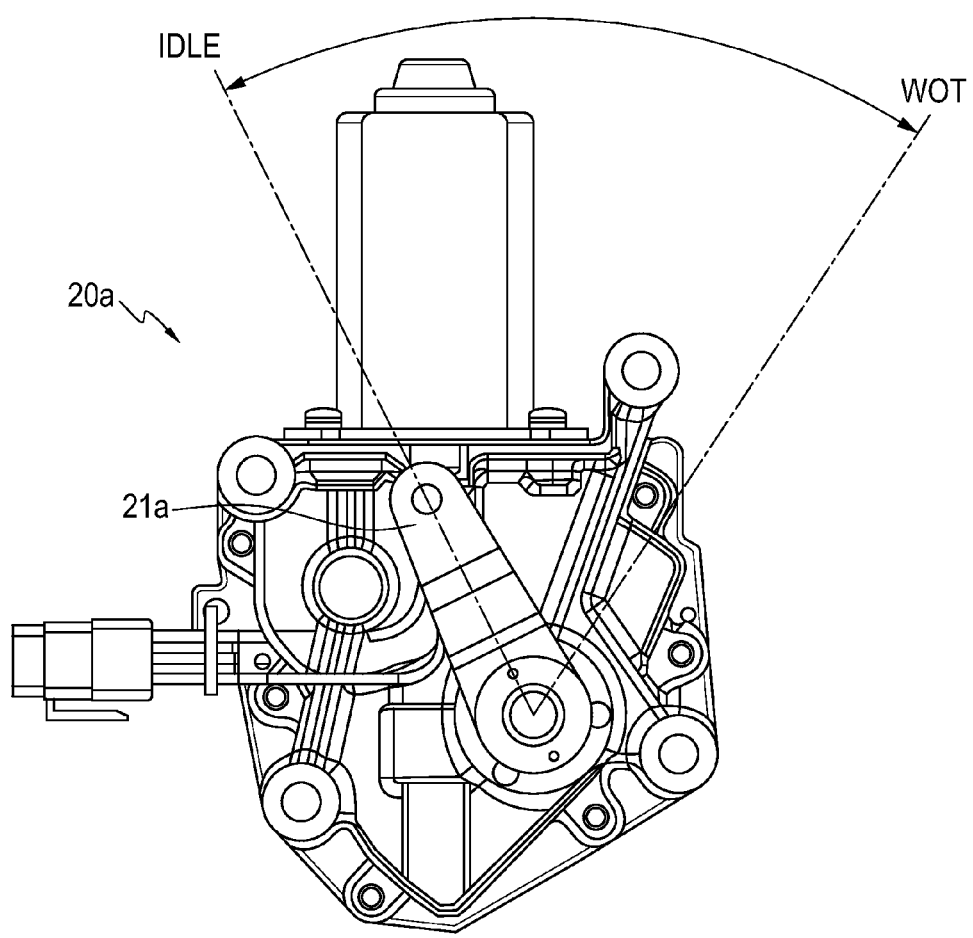
FIG. 8 is a side elevation view of a throttle actuator of the propulsion unit of FIG. 2 illustrating an operational range of an actuator arm thereof.

Referring back to FIGS. 4 and 5, the microprocessor supported by the control head 16 reads the position of the port control lever 30 and sends shift and throttle commands to the ESM 22*a* via the private CAN network 66. The ESM 22*a* commands the shift actuator 18*a* and throttle actuator 20*a* which are best shown in FIGS. 7 and 8, respectively. FIG. 7 shows that the shift actuator 18*a* has an actuator arm 19*a* which is moveable between a forward position and a reverse position with a neutral position therebetween. FIG. 8 shows that the throttle actuator 20*a* has an actuator arm 21*a* which is moveable between an idle position and a wide open throttle (WOT) position. An actuator position sensor 142, shown in FIG. 12, signals the actuator position to the ESM 22*a* shown in FIG. 4. This feedback may be used to govern the control head 16. The shift and throttle functions of the port side engine 12*a* are thereby controlled. It will be understood by a person skilled in the art that the shift and throttle functions of the starboard engine 12*c* are controlled in a similar manner using the starboard control lever 40 shown in FIG. 2. The shift and throttle functions of the center engine 12*b* are under the control of the port control lever 30 in this example.

Figure 21:
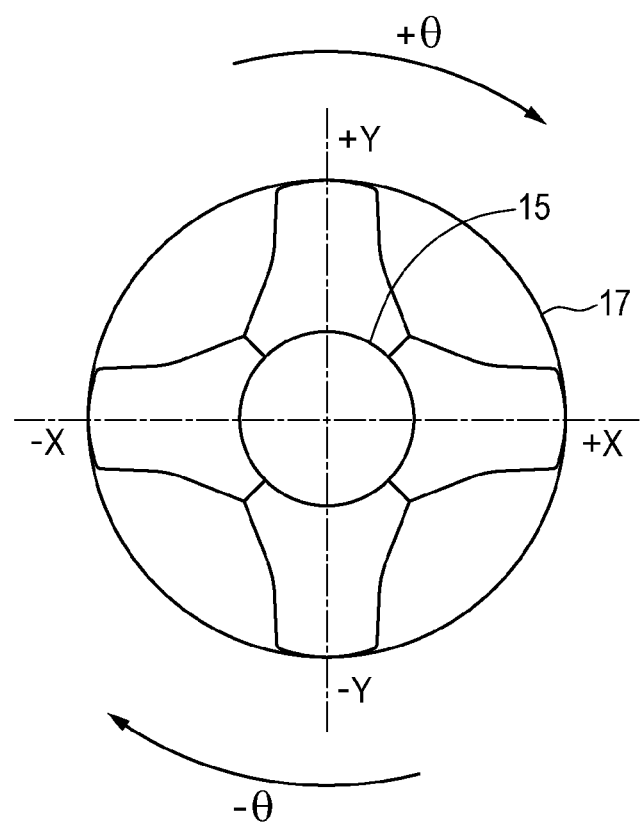
FIG. 21 is a simplified top plan view of the joystick of FIG. 20 showing a guided plate inside the joystick and the axes of movement of the joystick.
Figure 22:
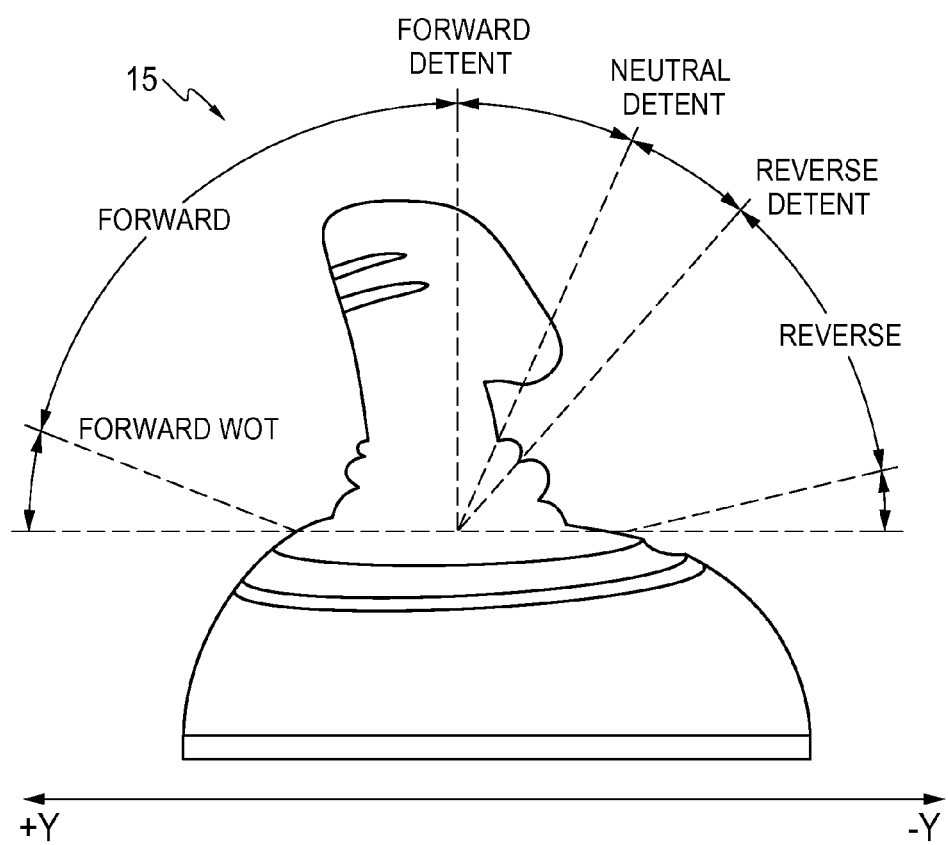
FIG. 22 is an elevation view of the joystick of FIG. 20 illustrating an operational range of the joystick.

Likewise, and with reference to FIGS. 21 and 22, the joystick 15 is moveable between a forward wide open throttle (forward WOT) position and a reverse wide open throttle (reverse WOT) position, through a neutral position along its Y-axis of movement. An operator is able to control the shift and throttle functions of the engines by moving the joystick 15 through its operational range. The joystick 15 is also provided with a forward detent, neutral detent, and reverse detent all disposed between the forward WOT position and reverse WOT position. This allows the operator to physically detect when the port joystick 15 has moved into a new shift/throttle position. The microprocessor supported by the joystick 15 reads the position of the joystick and sends shift and throttle commands to the ESM 22*a* via the private CAN network 66. Accordingly, either the joystick 15 or control head 16 may be used to control shift and throttle functions. However, as shown in FIG. 21, the joystick 15 is also moveable along an X-axis, Y-axis, and θ-axis to allow for vector thrusting. A guided field plate 60 provides preferential joystick movement.

The electronic shift and throttle control system 60 disclosed herein is also provided with an improved shift actuator 18*a* and throttle actuator 20*a* as shown in Figures actuators as shown in FIGS. 7 and 8 respectively. The shift and throttle actuators are both rotary actuators which have substantially the same structure and function in substantially the same manner, with the exception of the actuator arm 19*a* or 21*a*. This will be understood by person skilled in the art. Accordingly, only the throttle actuator 20*a* is described in detail herein.

Figure 9:
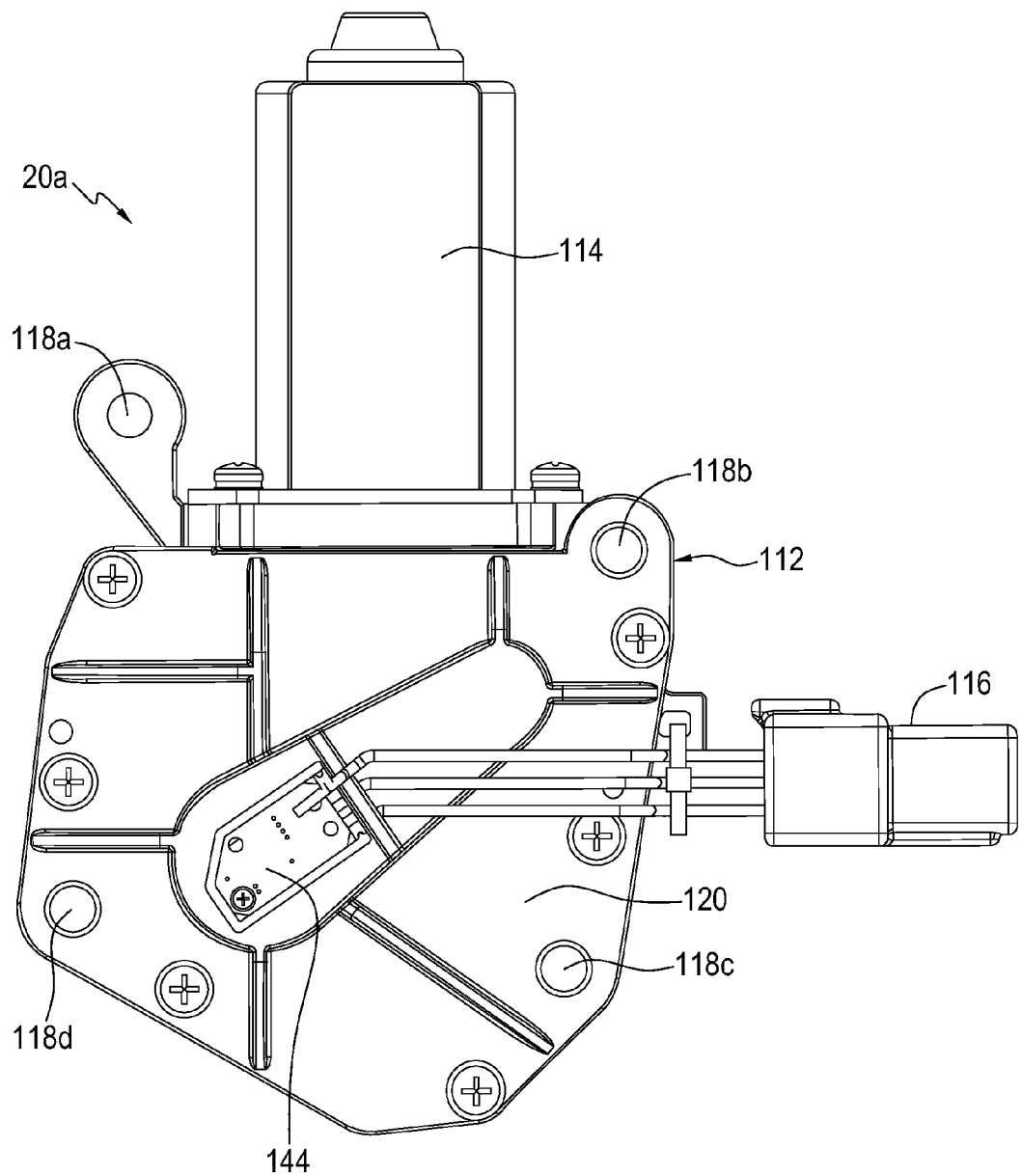
FIG. 9 is a side elevation view of the throttle actuator of FIG. 8 illustrating a second side thereof.
Figure 10:
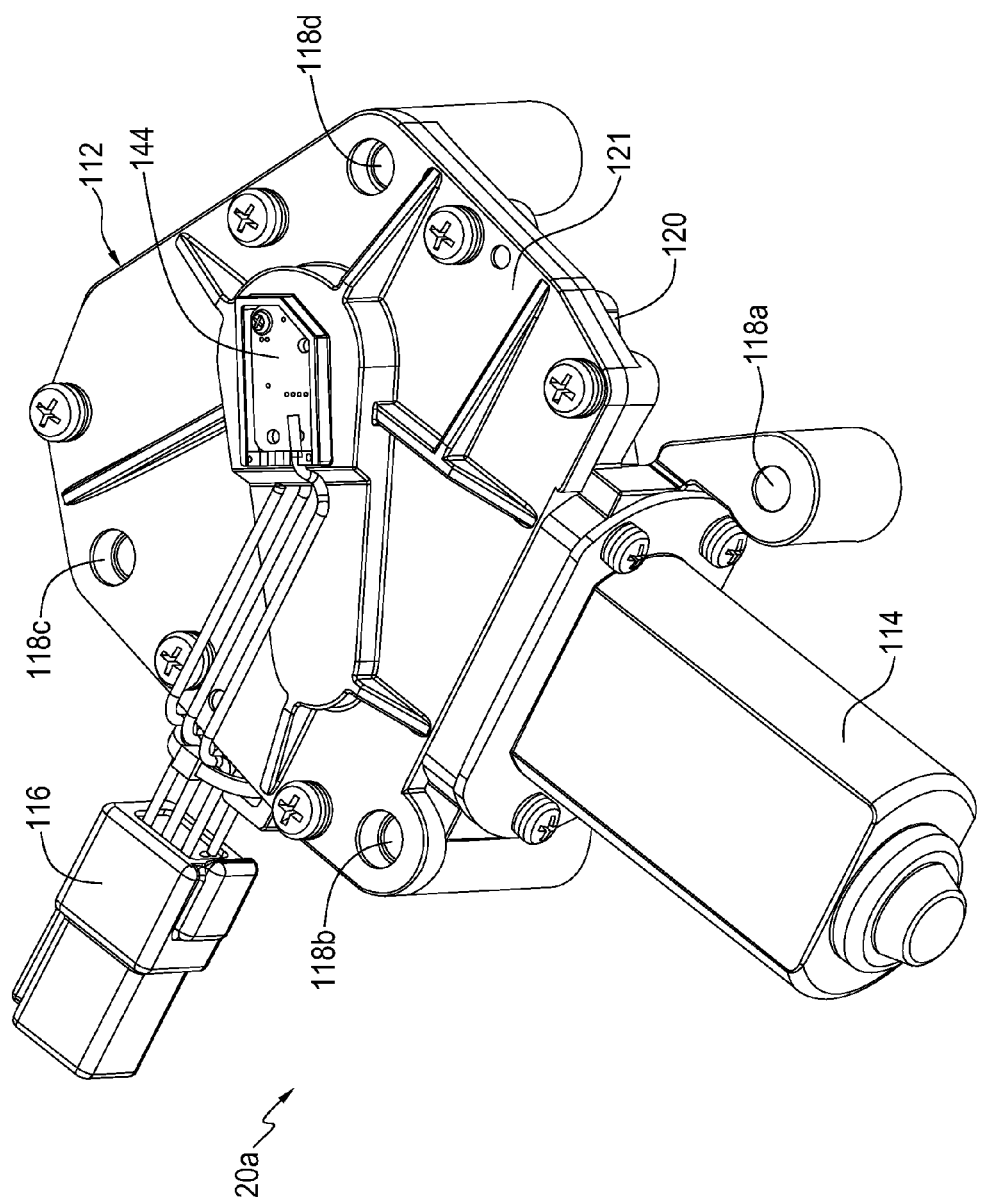
FIG. 10 is a perspective view of the throttle actuator of FIG. 8 illustrating the first side thereof.
Figure 11:
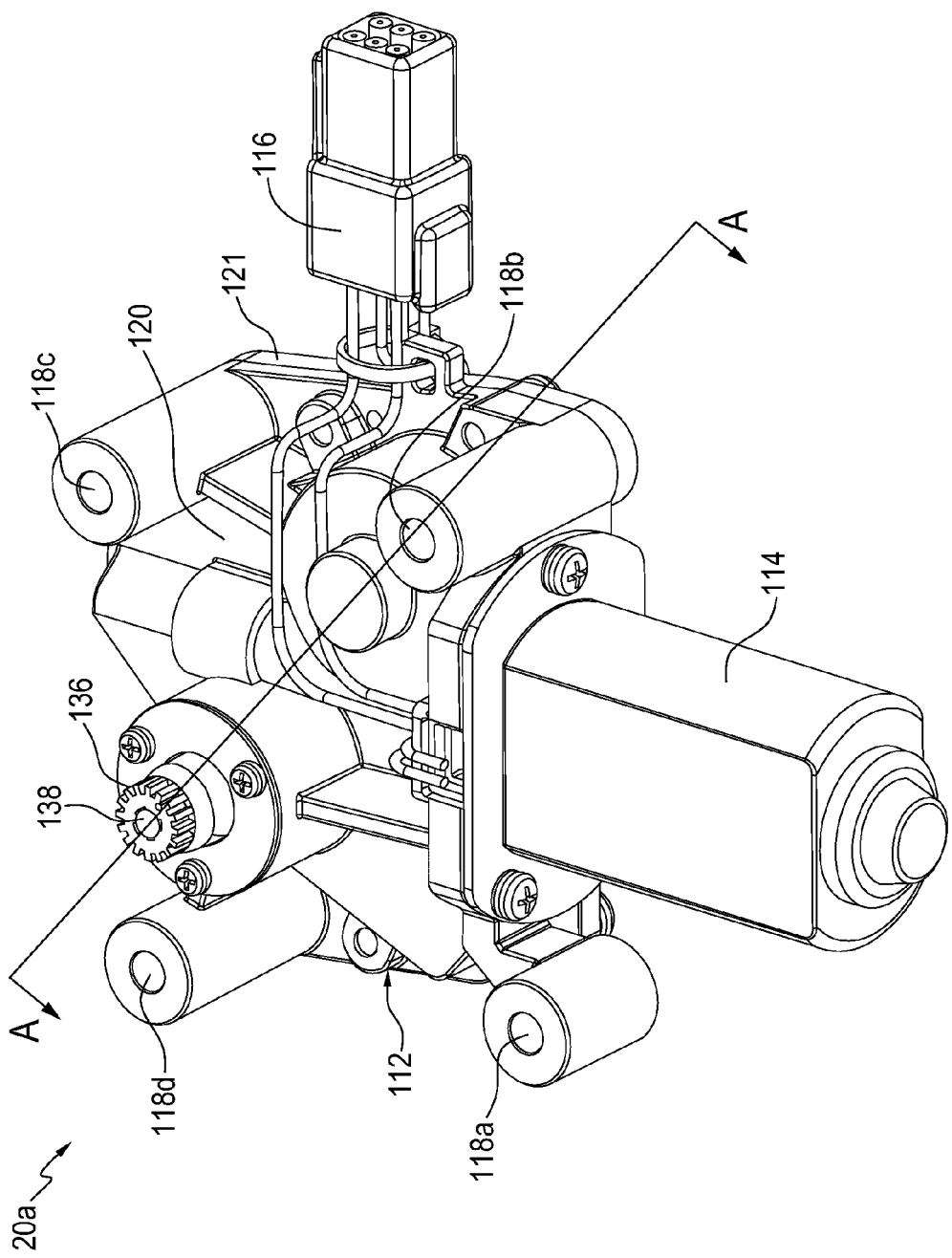
FIG. 11 is a perspective view of the throttle actuator of FIG. 8 illustrating the second side thereof.

Referring to FIGS. 7 through 11, the throttle actuator 20*a* of the port engine 12*a* is shown in greater detail. The throttle actuator 20*a* generally includes a waterproof housing 112 which encases various components, a motor 114 extending from and bolted to the housing 112, and a harness 116 for electrically connecting the throttle actuator 20*a* to the electronic shift and throttle system 60. The housing 112 is provided with a plurality of mounting holes 118*a*, 118*b*, 118*c*, and 118*d* allowing the throttle actuator 112 to be mounted as needed. In this example, the housing 112 also includes a body 120 and a cover 121 bolted the body 120. Removing the cover 121 provides access to the various components encased in the housing 112. The motor 114 may be rotated in either a first rotational direction or a second rotational direction opposite to the first direction depending on the direction of the electric current supplied to the motor 114. As best shown in FIG. 11, the harness 16 is wired to the motor 114 and supplies an electric current thereto.

Figure 12:
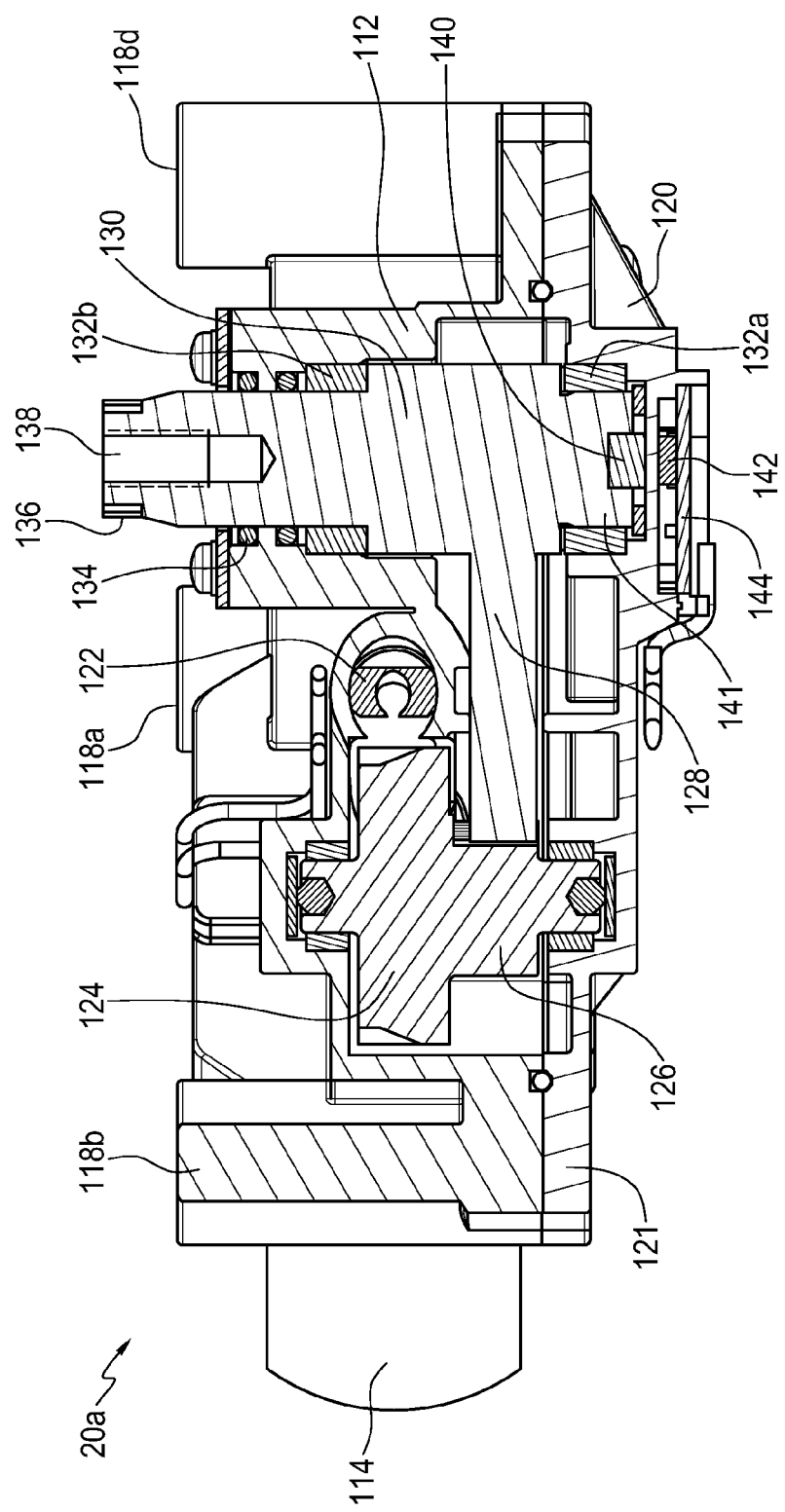
FIG. 12 is a sectional view taken along line A-A of FIG. 11.

Referring now to FIG. 12, the housing 112 encases a worm gear 122 which is coupled to an output shaft (not shown) of the motor 114. The worm gear 122 engages a worm wheel 124 which is integrated with a spur gear pinion 126. The worm gear 122 imparts rotary motion to both the worm wheel 124 and spur gear pinion 126. The spur gear pinion 126 imparts rotary motion to a sector spur gear 128 which is integrated with an output shaft 130 of the throttle actuator 20*a*. The output shaft 130 is thereby rotated by the motor 114. Bearings 132*a* and 132*b* are provided between the output shaft 130 and the housing 112 to allow free rotation of the output shaft 130 within the housing 112. A sealing member in the form of an O-ring 134 is provided about the output shaft 130 to seal the housing.

As best shown in FIG. 11, the distal end 136 of the output shaft 130 is splined. There is a longitudinal, female threaded aperture 138 extending into the output shaft 130 from the distal end 136 thereof. The aperture 138 is designed to receive a bolt to couple the output shaft 130 to the actuator arm 21*a* as shown in FIG. 8. Referring back to FIG. 12, there is a magnet 140 disposed at a proximal end 141 of the output shaft 130. There is also a position sensor 142 which senses a position of the magnet 140 as the output shaft 130 rotates. The position sensor 142 is thereby able to determine the rotating position of the output shaft 142. In this example, the position sensor 142 is a Hall Effect sensor but in other embodiments the sensor may be a magnetoresistive position sensor or another suitable magnetic rotational sensor. The position sensor 142 is mounted on a circuit board 144 which is mounted on the throttle actuator housing 112. More specifically, in this example, the circuit board 144 is mounted on the housing cover 121. As best shown in FIGS. 9 and 10, the circuit board 144 is wired to the harness 116 allowing the position sensor 142 to send an electrical signal to the ESM 22*a* which is shown in FIG. 4.

Figure 13:
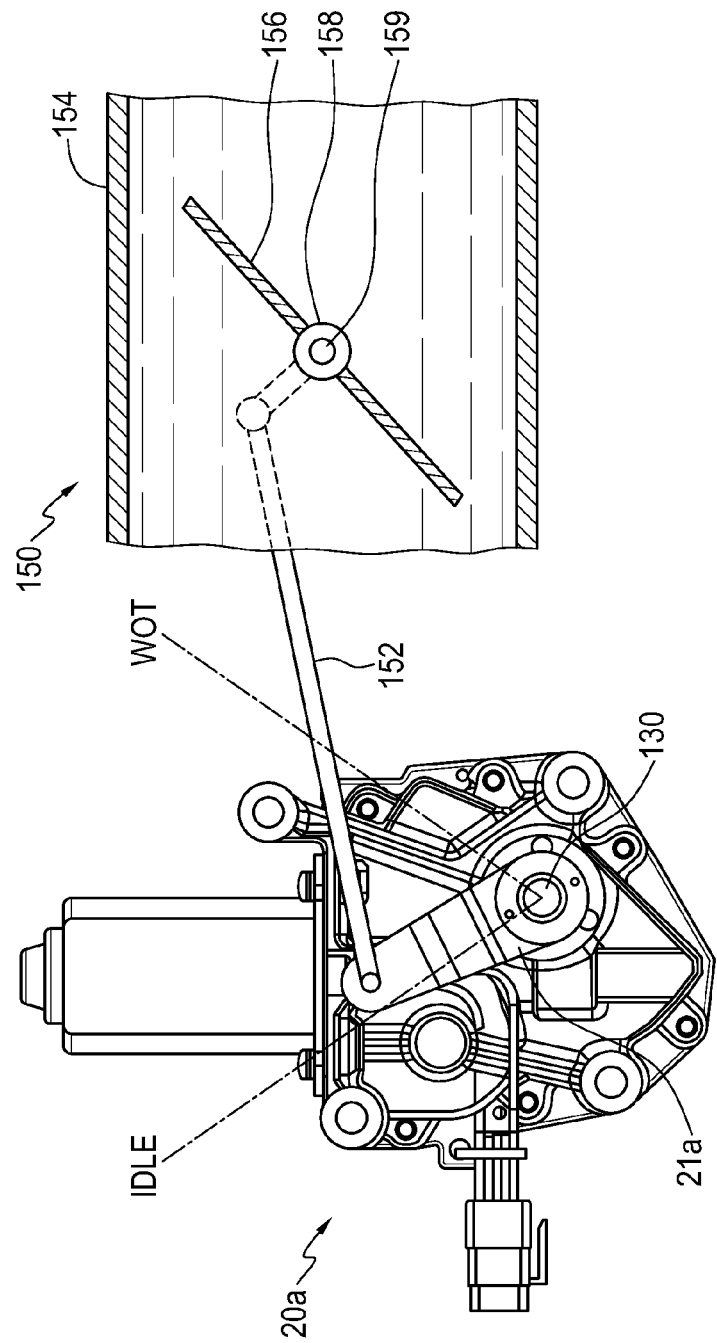
FIG. 13 is a fragmentary side view, partially in section and partly schematic, of the throttle actuator of FIG. 8, a throttle, and a linkage therebetween.

As best shown in FIG. 13, the actuator arm 21*a* is coupled to a throttle 150 of the port engine 12*a*, shown in FIG. 2, by a throttle linkage 152. The throttle 150 includes a throttle body 154 and a throttle plate 156 mounted on a rotatable throttle shaft 158. There is also a throttle position sensor (TPS) 159 mounted on top of the throttle shaft 158 which senses the position of the throttle shaft as it rotates. In this example, the TPS 159 is a potentiometer and communicates with the EMM 64*a* shown in FIG. 4. Together the plate 156, the shaft 158 and the TPS 159 form a butterfly valve member which is spring loaded to a closed position shown in FIG. 14. Referring back to FIG. 13, rotation of the actuator output shaft 130 drives the actuator arm 21a to rotate the throttle shaft 158. Rotation of the throttle shaft 158 causes the throttle 150 to move between an idle position shown in FIG. 14 and a WOT position shown in FIG. 15. Whether the throttle 150 is in the idle position or WOT position is dependent on the rotational position of output shaft 130. The throttle actuator 20a is an external actuator, the electronic shift and throttle system 60 may be installed as a kit on an existing engine.

To correlate position of the throttle 150 with the position of the actuator arm 21a, it is necessary calibrate the throttle controls of the electronic shift and throttle system 60. Once calibrated, the idle position of the actuator arm 21a will correspond to the idle position of the throttle 150.

Figure 14:
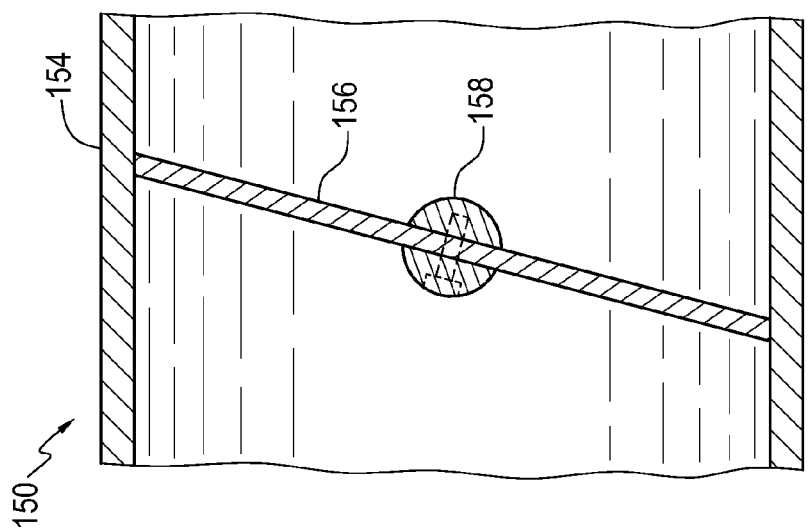
FIG. 14 is a sectional view of the throttle of FIG. 13 illustrating the throttle in an idle position.
Figure 15:
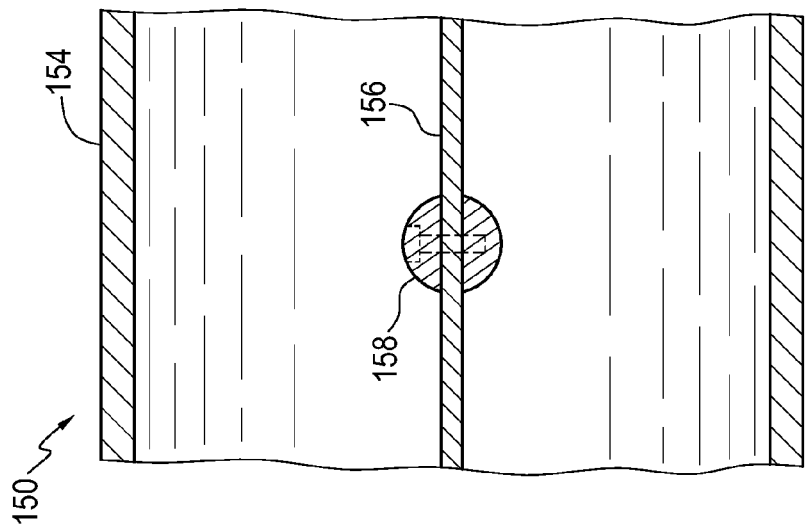
FIG. 15 is a sectional view of throttle of FIG. 13 illustrating the throttle in a wide open throttle (WOT) position.

The ESM 22a, shown in FIG. 4, calibrates the throttle controls by using the voltage level sent by the TPS 159, the duty cycle of the electrical signal sent by the actuator position sensor 142 and the amount of current flowing into the actuator motor 114. The voltage level of TPS 159 varies with the position of the throttle plate 156. In this example, the voltage level of TPS 159 is low when the throttle plate 156 is perpendicular and in contact with throttle housing 154, as shown in FIG. 14, and the voltage level of the TPS 159 is high when the throttle plate 156 is parallel with throttle housing 154 as shown in FIG. 15. The duty cycle of the electrical signal sent by the actuator position sensor 142 varies with the position of the throttle actuator arm 21a. In this example and as shown in FIG. 13, the duty cycle of position sensor 142 is low when the actuator arm 21a at the idle position and is high when the actuator arm 21a is at the WOT position. The amount of current flowing into the actuator motor 114 is low when the actuator arm 21a moves freely and increases when the throttle plate 156 is in contact with the throttle housing 154 thereby stalling the motor 114.

Figure 16:
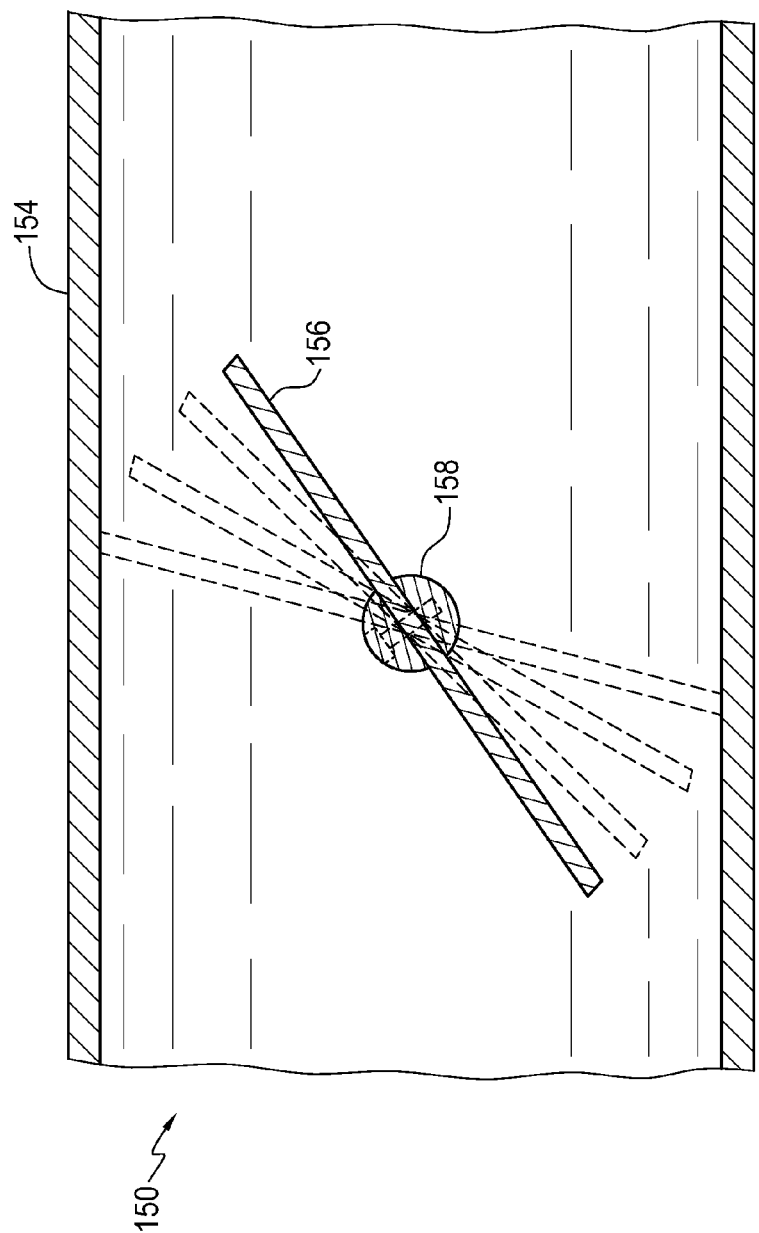
FIG. 16 is a sectional view of throttle of FIG. 13 illustrating movement of the throttle as the throttle controls are being calibrating.

The ESM 22a calibrates the throttle controls by determining the throttle position where the TPS voltage is the lowest, while avoiding residual tension in the throttle linkage 152. This is done by 20 opening the throttle 150 and moving it back to the idle position in increments. This is best shown in ghost in FIG. 16. The ESM 22a controls the opening of the throttle 150 and moves the throttle 150 back to the idle position. In this example, the throttle 150 is moved back in increments of 1° towards a hard stop, i.e. where the throttle plate 156 comes into contact with the throttle housing 154. At each increment the ESM 22a communicates 25 with the EMM 64a and requests the voltage level of the TPS 159 shown in FIG. 13. The ESM 22a stores the value. This is repeated until the throttle plate 156 comes to the hard stop. The ESM 22a determines if the throttle 150 is at the hard stop by measuring the current flowing in the actuator motor 114. The ESM 22a assumes that the throttle 150 is at the hard stop if the current is above a pre-determined value. The ESM 22a then establishes the idle position as being where the lowest valid voltage level that is at least a minimal distance away from hard stop was measured. The minimal distance from the hard stop ensures that the tension created in the throttle linkage 152 while moving the throttle plate 156 against the hard stop is released. In this example, the minimal distance is defined in degrees and set to 0.75°. However, the minimal distance may range for example between 0.3° and 1.5°.

In this example, the calibration procedure will terminate successfully if the following parameters are met:
1. The voltage level of the signal from the throttle position sensor has changed more than the movement amount while calibrating (in this example 0.2V). This amount confirms the actuator actually moved the throttle plate.
2. The minimum expected idle position voltage level (in this example 0.3V)<=the voltage level of the signal from the throttle position sensor in the idle position<=the maximum expected idle position voltage level (in this example 0.62V).

The values may vary in other embodiments.

Figure 17:
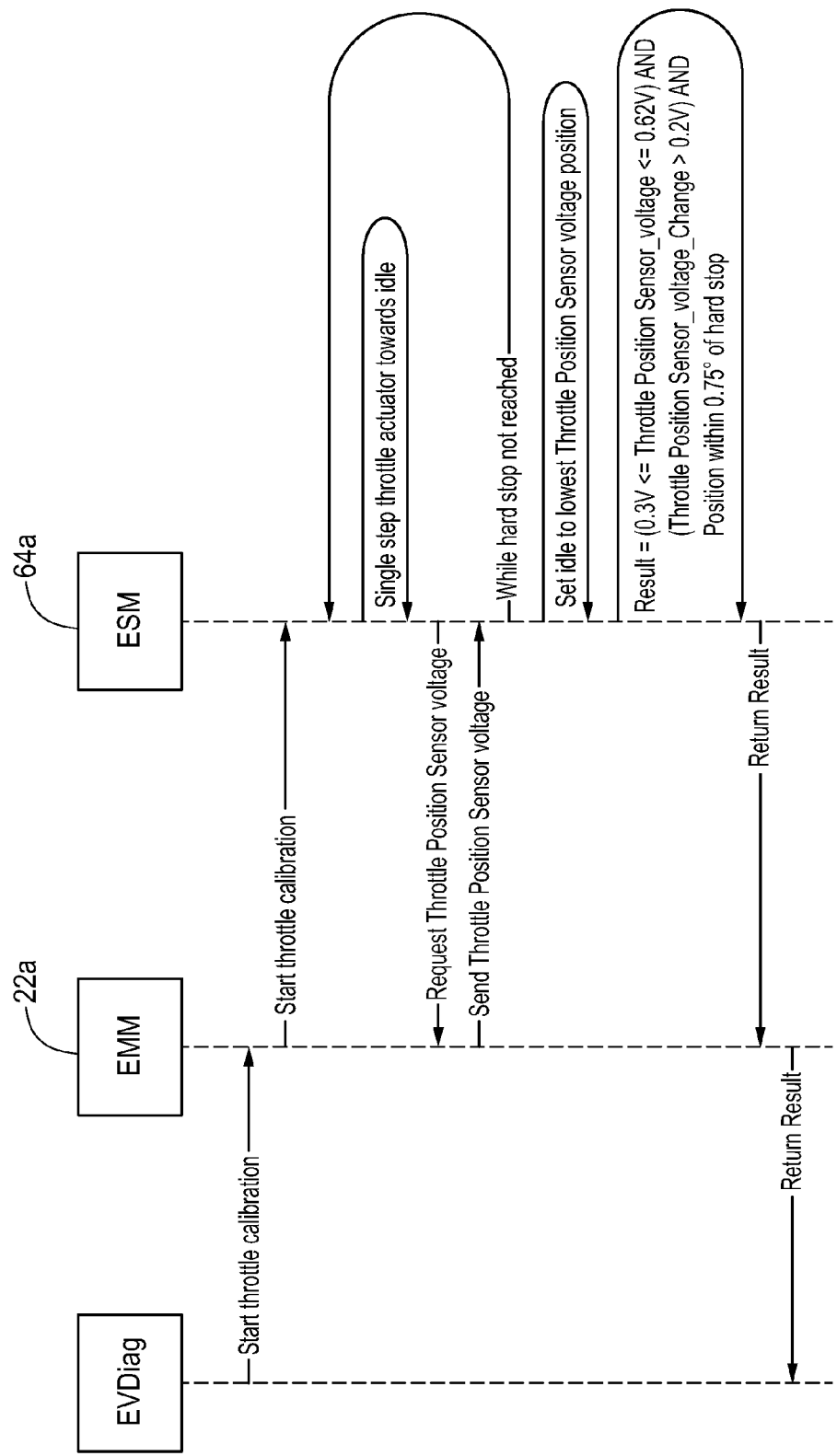
FIG. 17 is a flow chart illustrating the logic of a throttle calibration method disclosed herein.

FIG. 17 best shows the above described calibration procedure. The new calibration position is stored in EEPROM if the calibration procedure terminates successfully. A similar calibration procedure is used for the center and starboard engines.

Referring back to FIG. 3, once the calibration procedure is completed, the operator can more accurately increase or decrease engine throttle by moving the joystick 15 or the port control lever 30 through its operational range. The operator can also shift gears by moving the joystick 15 or the port control lever 30 through its operational range. The control head 16 sends shift and throttle commands to the ESM 64a which is shown in FIG. 4. The ESM 64a then commands the shift actuator 18a and the throttle 20a actuator of the port engine 12a. However, the ESM 64a will not command the shift actuator 20a to shift gears if the engine speed is above a predetermined maximum threshold speed, even if the ESM 64a is commanded to do so by the control head 16. In this example, the predetermined maximum threshold speed is 1,500 RPM. Instead the ESM 64a will command the throttle actuator 18a to move to the idle position in order to lower the engine speed. The ESM 64a will also command the throttle actuator 18a to move to the idle position when an actual gear of the port engine 12a is not the same as a commanded gear.

Figure 18:
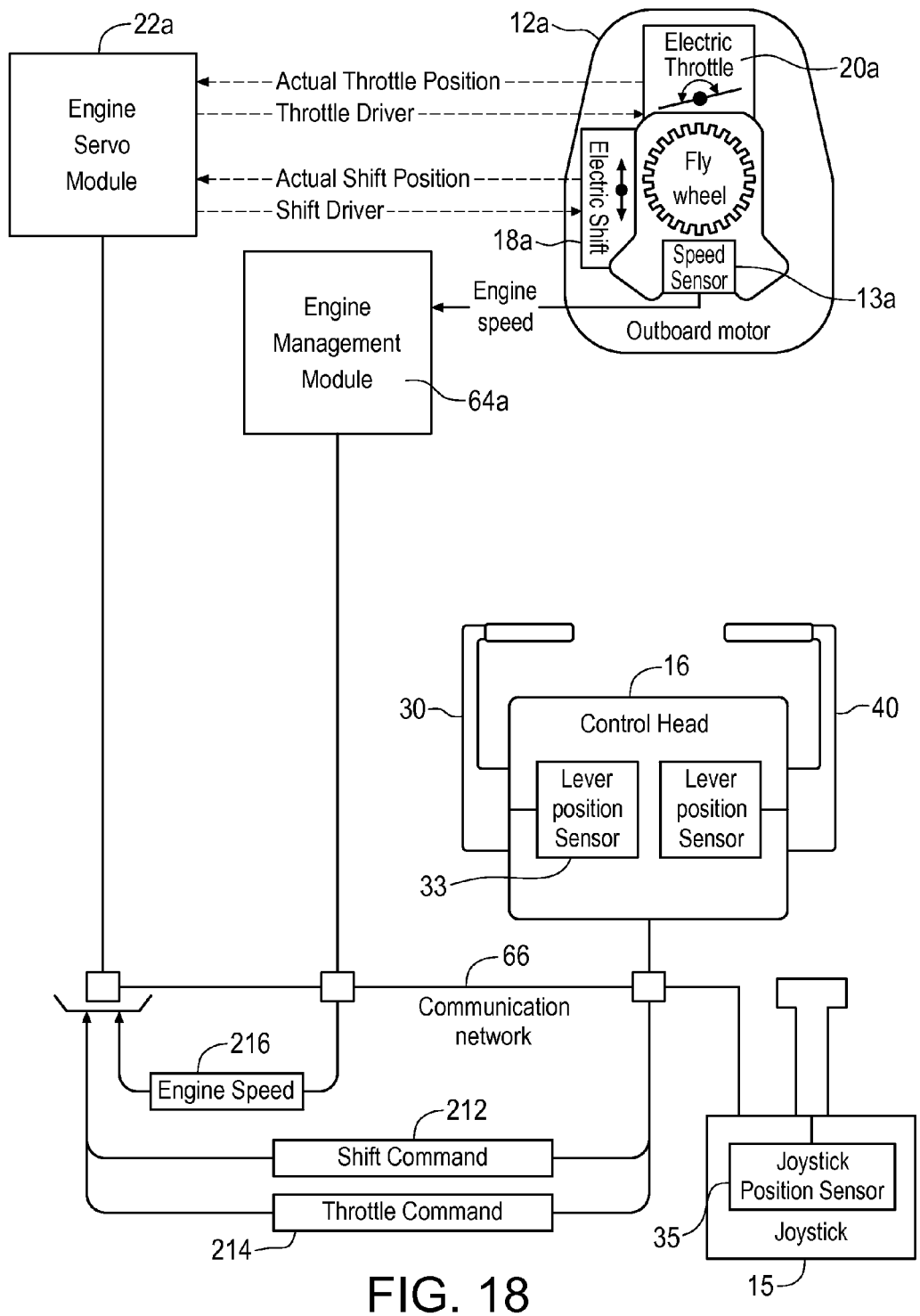
FIG. 18 is a schematic diagram illustrating the delay of shift and throttle functions.

FIG. 18 shows a method for delaying shift commands 212 and throttle commands 214 for the port engine 12a. When the control head 16 is used input shift and throttle functions a position sensor 33, that is part of the control head 16, reads the position of the port control lever 30. When the joystick 15 is used input shift and throttle functions a position sensor 35, that is part of the joystick 15, reads the position of the port joystick 15. The joystick 15 or control head 16 then sends shift and throttle commands 212 and 214 to the ESM 64a of the port engine 12a over the CAN network 66. The shift and throttle commands 212 and 214 are based on the position of the joystick 15 or the port control lever 30. The ESM 64a commands the shift actuator 18a and throttle actuators 20a of the port engine 12a. The port engine 12a is also provided with a speed sensor 13a. The speed sensor 13a signals the engine speed to the EMM 22a. The EMM 22a communicates the engine speed 216 to the ESM 64a over the CAN network 66. The ESM 64a will delay commanding the shift actuator 18a to shift gears if the engine speed is above the predetermined maximum threshold speed of 1,500 RPM. Meanwhile, the ESM 64a will command the throttle actuator 18a to move to the idle position. This eventually causes the engine speed to drop below 1,500 RPM. The ESM 64a then commands the shift and throttle actuators 18a and 20a in accordance with the shift and throttle commands 212 and 214 received from the joystick 15 or the control head 16. To prevent stalling, the ESM 64a will not command the shift actuator 20a to shift gears unless the engine speed 216 is above a predetermined minimum threshold speed. In this example, the predetermined minimum threshold speed is 800 RPM. However, in other examples, the minimum threshold value may be in the range of 500 RPM to 1100 RPM.

Figure 19:
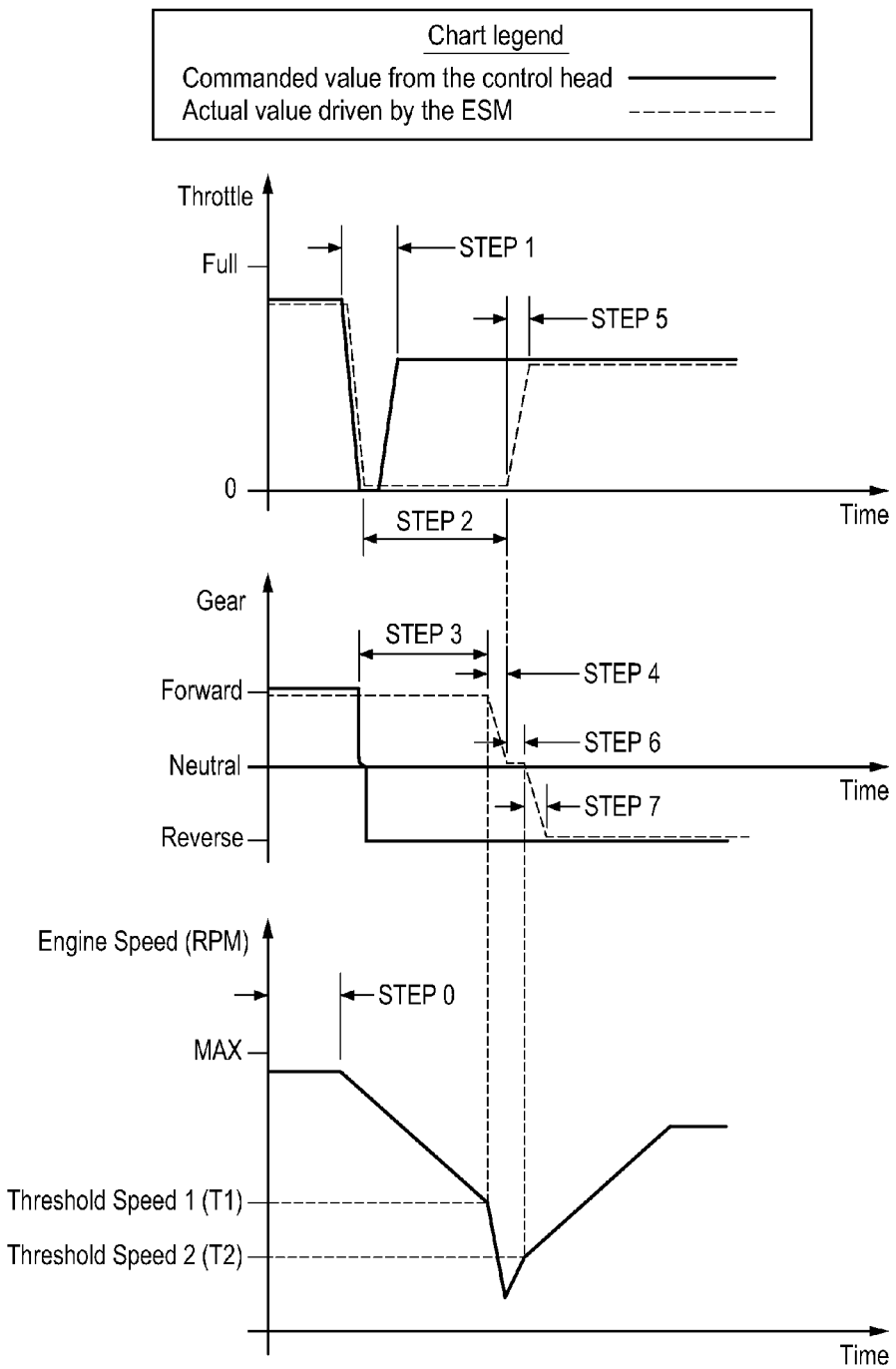
FIG. 19 is set of tables illustrating the delay of shift and throttle functions.

FIG. 19 is a graphical representation which shows delaying shift and throttle commands based on engine speed. The following is a description of the steps illustrated.

STEP 0—The joystick or the control lever is in a forward position, the engine is in forward gear, and the engine speed is above the predetermined maximum threshold speed.

STEP 1—The operator quickly moves the joystick or the control lever from the forward position to a reverse position. The ESM commands the throttle actuator to move the throttle to the idle position STEP 2—The throttle is kept at the idle position to allow the engine speed to drop.

STEP 3—The ESM waits until the engine speed drops below the predetermined maximum threshold speed before commanding the shift actuator to shift to neutral.

STEP 4—The ESM commands the shift actuator to shift into neutral after the engine speed drops below the predetermined maximum threshold speed (T1).

STEP 5—The ESM applies the throttle command after the shift actuator shifts into neutral. This causes the engine speed to increase.

STEP 6—The ESM applies the shift command after the engine speed rises above the predetermined minimum threshold speed (T2). This prevents the engine from stalling.

STEP 7—The ESM commands the shift actuator to shift into reverse.

Accordingly, and with reference to FIG. 4, if the operator quickly moves the joystick 15 or the control lever 30 from the forward WOT position to the reverse WOT position, the ESM 64a will not command the shift actuator 18a to shift gears until the engine speed drops below 1,500 RPM. The same logic applies when the joystick or the control lever is moved from a reverse position to a forward position.

The method and system for delaying shift and throttle commands based on engine speed disclosed herein allows an operator to quickly shift from forward high throttle to reverse high throttle or vice versa without overstressing the gear box and while helping to prevent the engine from stalling under the high opposite force of a propeller.

It will be understood by a person skilled in the art that the method and system for delaying shift and throttle commands based on engine speed disclosed herein may be implemented in any electronic shift and throttle control system, regardless of whether the vehicle is a marine vessel.

It will further be understood by a person skilled in the art that many of the details provided above are by way of example only, and are not intended to limit the scope of the invention which is to be determined with reference to following claims.

What is claimed is:

1. A method for delaying shift and throttle commands based on engine speed in an electronic shift and throttle system, the method comprising the steps of:
    establishing a first threshold engine speed;
    determining a position of a joystick which allows an operator to manually control shift and throttle functions;
    determining a shift command based on the position of the joystick and determining a throttle command based on the position of the joystick;
    delaying execution of the shift command by a shift actuator if the engine speed is above the first threshold engine speed; and
    delaying execution of the throttle command by a throttle actuator if the engine speed is above the first threshold engine speed.

2. The method as claimed in claim 1 wherein the step of delaying execution of the throttle command includes:
    moving the throttle actuator to an idle position to decrease the engine speed; and
    delaying execution of the throttle command until after the engine speed falls below the first predetermined threshold engine speed.

3. The method as claimed in claim 2 further including the step of moving the shift actuator to a neutral position prior to execution of the throttle command.

4. The method as claimed in claim 3 wherein the step of moving the shift actuator to the neutral position includes moving the shift actuator to the neutral position after the engine speed falls below the first predetermined threshold engine speed.

5. The method as claimed in claim 1 further including the step of establishing a second threshold engine speed and wherein the step of delaying execution of the shift command includes:
    moving the throttle actuator to an idle position to decrease the engine speed;
    moving the shift actuator to a neutral position after the engine speed falls below the first predetermined threshold engine speed;
    executing the throttle command to increase the engine speed after the shift actuator is moved to the neutral position; and
    delaying the execution of the shift command until after the engine speed rises above the second predetermined threshold engine speed.

6. The method as claimed in claim 1 wherein the step of establishing the first threshold engine speed includes establishing the first threshold engine speed at 1,500 RPM.

7. The method as claimed in claim 5 wherein the step of establishing the second threshold engine speed includes establishing the second threshold engine speed between 500 RPM and 1100 RPM.

8. The method as claimed in claim 5 wherein the step of establishing the second threshold engine speed includes establishing the second threshold engine speed at an engine speed lower than the first threshold engine speed.

9. A method for delaying shift and throttle commands based on engine speed in an electronic shift and throttle system, the method comprising the steps of:
    establishing a first threshold engine speed and a second engine threshold speed;
    determining a position of a joystick which allows an operator to manually control shift and throttle functions;
    determining a shift command based on the position of the joystick and determining a throttle command based on the position of the joystick;
    moving the throttle actuator to an idle position to decrease the engine speed until the engine speed falls below the first threshold engine speed;
    moving the shift actuator to a neutral position after the engine speed falls below the first predetermined threshold engine speed;
    delaying the execution of the throttle command until after the shift actuator is moved to the neutral position; and
    delaying the execution of the shift command until after the execution of the throttle command and the engine speed rises above the second predetermined threshold engine speed.

10. The method as claimed in claim 9 further wherein the step of establishing the first threshold engine speed includes establishing the first threshold engine speed at 1,500 RPM.

11. The method as claimed in claim 9 further wherein the step of establishing the second threshold engine speed includes establishing the second threshold engine speed at between 500 RPM and 1100 RPM.

12. The method as claimed in claim 9 wherein the step of establishing the second threshold engine speed includes establishing the second threshold engine speed at an engine speed lower than the first threshold engine speed.

13. A method for delaying shift and throttle commands based on engine speed in an electronic shift and throttle system, the method comprising the steps of:
establishing a first threshold engine speed at 1,500 RPM and a second engine threshold speed at between 500 RPM and 1100 RPM;
determining a position of a joystick which allows an operator to manually control shift and throttle functions;
determining a shift command based on the position of the joystick and determining a throttle command based on the position of the joystick;
moving the throttle actuator to an idle position to decrease the engine speed until the engine speed falls below the first threshold engine speed;
moving the shift actuator to a neutral position after the engine speed falls below the first predetermined threshold engine speed;
delaying the execution of the throttle command until after the shift actuator is moved to the neutral position; and
delaying the execution of the shift command until after the execution of the throttle command and the engine speed rises above the second predetermined threshold engine speed.

14. A method for delaying shift commands when gears are changed in an electronic shift and throttle system based on engine speed, the method comprising the steps of:
establishing a first threshold engine speed and a second threshold engine speed;
determining a position of a joystick which allows an operator to manually control shift;
determining a shift command based on the position of the joystick;
moving the throttle actuator to an idle position to decrease the engine speed until the engine speed falls below the first threshold engine speed;
moving the throttle actuator to an open position to increase the engine speed after the engine speed falls below the first predetermined threshold engine speed;
delaying the execution of the shift command until the execution of the throttle command and the engine speed rises above the second predetermined threshold engine speed.

15. The method as claimed in claim 14 further wherein the step of establishing the first threshold engine speed includes establishing the first threshold engine speed at 1,500 RPM.

16. The method as claimed in claim 14 further wherein the step of establishing the second threshold engine speed includes establishing the second threshold engine speed at 500 RPM and 1100 RPM.

17. The method as claimed in claim 14 wherein the step of establishing the second threshold engine speed includes establishing the second threshold engine speed at an engine speed lower than the first threshold engine speed.

18. An electronic shift and throttle system for delaying shift and throttle commands based on the speed of an engine, the system comprising:
a sensor for sensing the speed of the engine;
a shift actuator for shifting between a forward gear and a reverse gear through a neutral gear;
a throttle actuator for moving a throttle between an idle position and a wide open throttle position;
a control head including a joystick for manually controlling shift and throttle functions of the engine, the joystick being moveable through a range of positions;
an engine control unit for determining a shift command and a throttle command based on a position of the joystick;
an engine servo module for delaying execution of the shift command if the speed of the engine is above a first predetermined threshold engine speed, the engine servo module commanding the throttle actuator to move the throttle to the idle position to decrease engine speed and the engine servo module delaying execution of the shift command until after the engine speed falls below the first predetermined threshold engine speed.

19. The system as claimed in claim 18 wherein the engine servo module commands the throttle actuator to move the throttle actuator towards the wide open throttle position to increase the engine speed after the engine speed falls below the first predetermined threshold speed, and the engine servo module delaying execution of the shift command until the engine speed rises above a second predetermined threshold engine speed.

20. The system as claimed in claim 18 where in the engine servo module commands the shift actuator to shift to the neutral gear after the engine speed falls below the first predetermined threshold engine speed, and the engine servo module the delaying execution of the throttle command until after the shift actuator shifts to the neutral gear.

* * * * *